United States Patent
Peter

(10) Patent No.: US 6,848,645 B2
(45) Date of Patent: Feb. 1, 2005

(54) BELT RETRACTOR FOR A VEHICLE SAFETY BELT

(75) Inventor: Cornelius Peter, Bühl (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 10/419,567

(22) Filed: Apr. 21, 2003

(65) Prior Publication Data

US 2003/0201359 A1 Oct. 30, 2003

(30) Foreign Application Priority Data

Apr. 26, 2002 (DE) .................................... 202 06 667 U

(51) Int. Cl.[7] .................... B60R 22/343; B60R 22/405
(52) U.S. Cl. .................. 242/390.9; 242/374; 242/383.4
(58) Field of Search ........................ 242/390.8, 390.9, 242/374, 375.1, 383, 383.1, 383.4, 384, 384.1; 280/806, 807; 297/478

(56) References Cited

U.S. PATENT DOCUMENTS

| | | | |
|---|---|---|---|
| 5,794,875 A | 8/1998 | Schmid | 242/374 |
| 6,158,685 A | 12/2000 | Kielwein et al. | 242/383.2 |
| 6,390,403 B2 * | 5/2002 | Specht | 242/374 |
| 2003/0116669 A1 * | 6/2003 | Fujii et al. | 242/383 |

FOREIGN PATENT DOCUMENTS

| | | |
|---|---|---|
| DE | 19513724 | 10/1996 |
| DE | 10018972 | 10/2001 |
| EP | 0972684 | 1/2000 |
| FR | 2696693 | 4/1994 |

* cited by examiner

*Primary Examiner*—John M. Jillions
(74) *Attorney, Agent, or Firm*—Tarolli, Sundheim, Covell & Tummino L.L.P.

(57) ABSTRACT

A belt retractor for a vehicle safety belt comprises a frame, a belt spool which is rotatably arranged in the frame, and a drive motor which can cooperate with a drive wheel which is coupled with the belt spool. The retractor further comprises a locking catch and locking teeth into which the locking catch can be guided in order to lock the belt spool. The drive wheel is rotatable relative to the belt spool to a limited extent and the locking catch is controlled as a function of this relative rotation.

14 Claims, 5 Drawing Sheets

BELT RETRACTOR FOR A VEHICLE SAFETY BELT

TECHNICAL FIELD

The invention relates to a belt retractor for a vehicle safety belt.

BACKGROUND OF THE INVENTION

A conventional belt retractor comprises a frame, a belt spool which is rotatably arranged in the frame, a drive motor which can cooperate with a drive wheel which is coupled with the belt spool, a locking catch and locking teeth into which the locking catch can be guided in order to lock the belt spool.

Such a belt retractor is known from the DE 100 18 972. The locking catch is biased by a spring in the sense of an engagement into the locking teeth. An electromagnet is provided, which in the ON-state holds the locking catch out of engagement with the locking teeth.

The object of the invention consists in improving the known belt retractor to the effect that a lower structural expenditure results.

BRIEF SUMMARY OF THE INVENTION

According to the invention, a belt retractor for a vehicle safety belt comprises a frame, a belt spool which is rotatably arranged in the frame, and a drive motor which can cooperate with a drive wheel which is coupled with the belt spool. The retractor further comprises a locking catch and locking teeth into which the locking catch can be guided in order to lock the belt spool. The drive wheel is rotatable relative to the belt spool to a limited extent and the locking catch is controlled as a function of this relative rotation. The belt retractor proposed is based on the fundamental idea of using the drive motor for the belt spool, which is already present in any case, also to control the locking catch. This takes place in that the drive motor is controlled such that the relative rotation between the drive wheel and the belt spool, necessary to control the locking catch, is produced. This makes it possible to dispense with additional components which were necessary hitherto to actuate the locking catch.

Preferably, provision is made that the locking teeth are constructed on a locking wheel which is securely connected with the belt spool, and that between the drive wheel and the locking wheel at least one restoring spring is provided, which biases the drive wheel relative to the locking wheel into an initial position. In so doing, preferably the locking catch is biased by a locking spring permanently in the sense of an engagement into the locking teeth, the drive wheel being provided with control teeth which are formed by depressions in the otherwise smooth outer peripheral surface of the drive wheel, and the locking teeth and the control teeth being constructed such that in the initial position between the drive wheel and the locking wheel, the outer peripheral surface of the drive wheel prevents the locking catch from being guided into the locking teeth. The restoring spring can be dimensioned here such that the drag moment of the current-free drive motor is greater than the moment of rotation which is necessary for rotating the drive wheel relative to the locking wheel. In this way, an emergency locking is achieved, which locks the belt spool in the belt band withdrawal direction when the drive motor is at a standstill. The restoring spring can also be dimensioned so as to be stronger, so that with a slow withdrawal of belt band from the belt spool, a relative rotation does not occur between the drive wheel and the locking wheel, but rather only on exceeding of a predetermined angular acceleration of the belt spool, because in this case the rotational moment of inertia of the drive motor additionally acts as a brake. In this way, a locking function can be realized, which corresponds to a conventional mechanical, belt band-sensitive locking.

According to a preferred embodiment of the invention, provision is made that the side of the locking teeth cooperating with the locking catch is not undercut. This makes it possible for the control teeth of the drive wheel to guide the locking catch out from the locking teeth when the belt spool is locked, without the belt spool having to be turned in the belt band winding direction for this purpose; such a rotation would be felt by the vehicle occupant as an unpleasant, brief increase to the belt band force.

Preferably, a winding spring is provided which acts upon the belt spool in the belt band winding direction with a moment of rotation which is greater than the drag moment of the drive motor when the latter is current-free. This also ensures an emergency function to the effect that in the case of an interruption in the electrical supply of the drive motor, or in the case of failure of its control, in each case it is ensured that the belt band is wound up correctly when the vehicle occupant removes the safety belt.

Preferably, an electronic control unit is provided, which controls the drive motor such that on withdrawing or winding up of the belt band, a predetermined belt band force is always in effect. The control unit recognizes the rotation of the belt spool, for example by means of a belt spool sensor, and controls the drive motor and hence the rotation of the belt spool such that the belt band is available in the desired manner. When the vehicle occupant puts on the safety belt, for example, the drive motor provides a moment of rotation which is opposed to the moment of rotation of the winding spring. In this way, a comparatively low belt band withdrawal force is produced. The moment of rotation provided by the drive motor is preferably varied here such that for the vehicle occupant a constant belt band withdrawal force is perceptible, although the moment of rotation exerted by the winding spring rises with increasing belt band withdrawal. The drive motor can also provide a moment of rotation on winding up of the belt band, which counteracts the moment of rotation of the winding spring. In this way, the comparatively high belt band winding force of the winding spring is reduced to a more comfortable amount.

The control unit may have a signal input for the vehicle acceleration, the control unit controlling the drive motor on exceeding a predetermined vehicle acceleration such that the drive wheel is brought into a locking position relative to the locking wheel, in which the locking catch engages into the locking teeth. The signal for the vehicle acceleration may originate from systems already present, for example from an electronic stability program or an anti-locking system, and supplied to the control unit via a vehicle bus system, for example a CAN-bus. In this way, the vehicle-sensitive locking of the belt spool can be realized with minimum expenditure.

Advantageous developments of the invention will be apparent from the subclaims.

DETAILED DESCRIPTION OF THE PREFERRED EMBODIMENT

Figure 1:
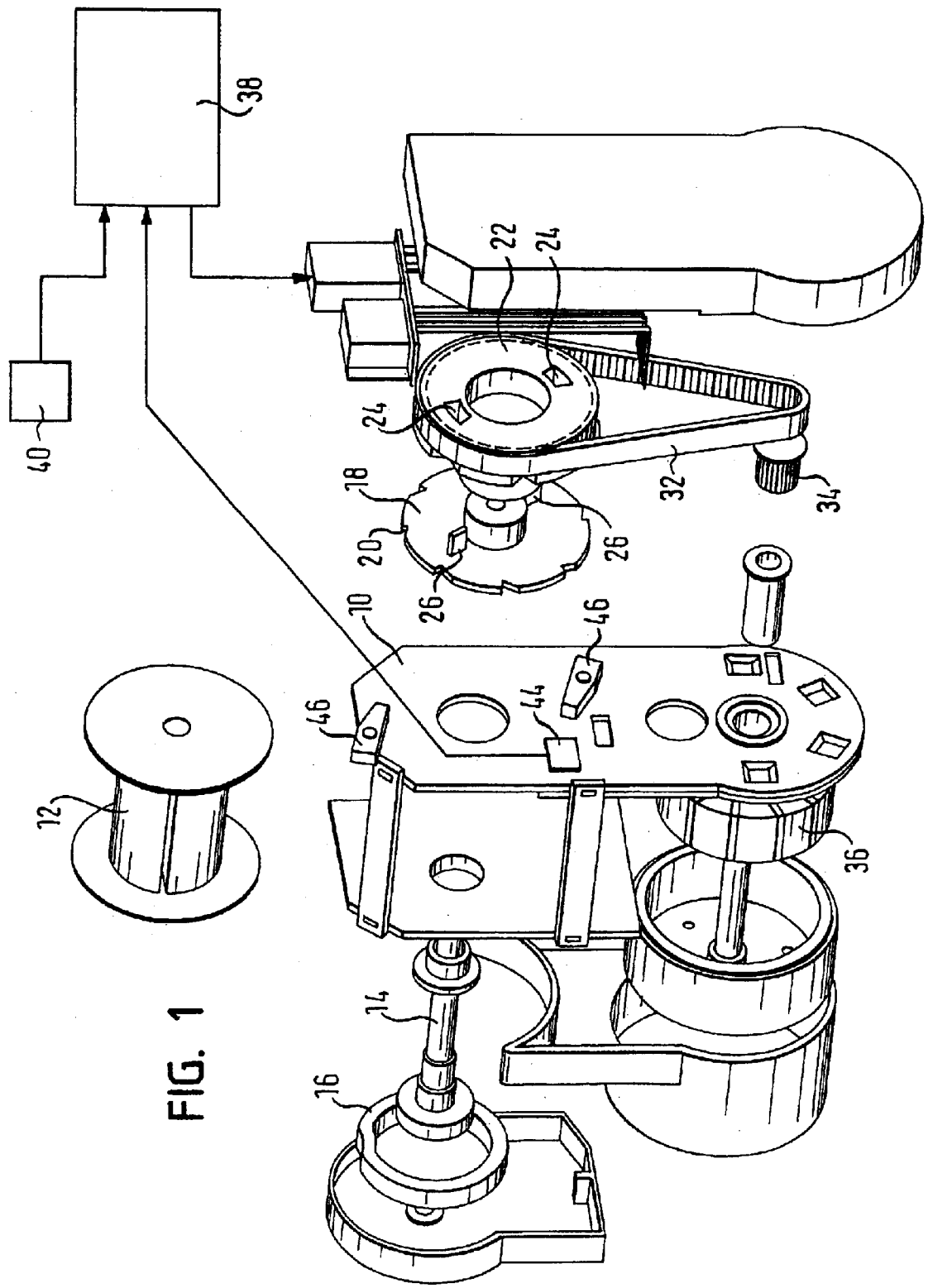
FIG. 1 shows in a diagrammatic exploded view a belt retractor according to the invention.
Figure 2:
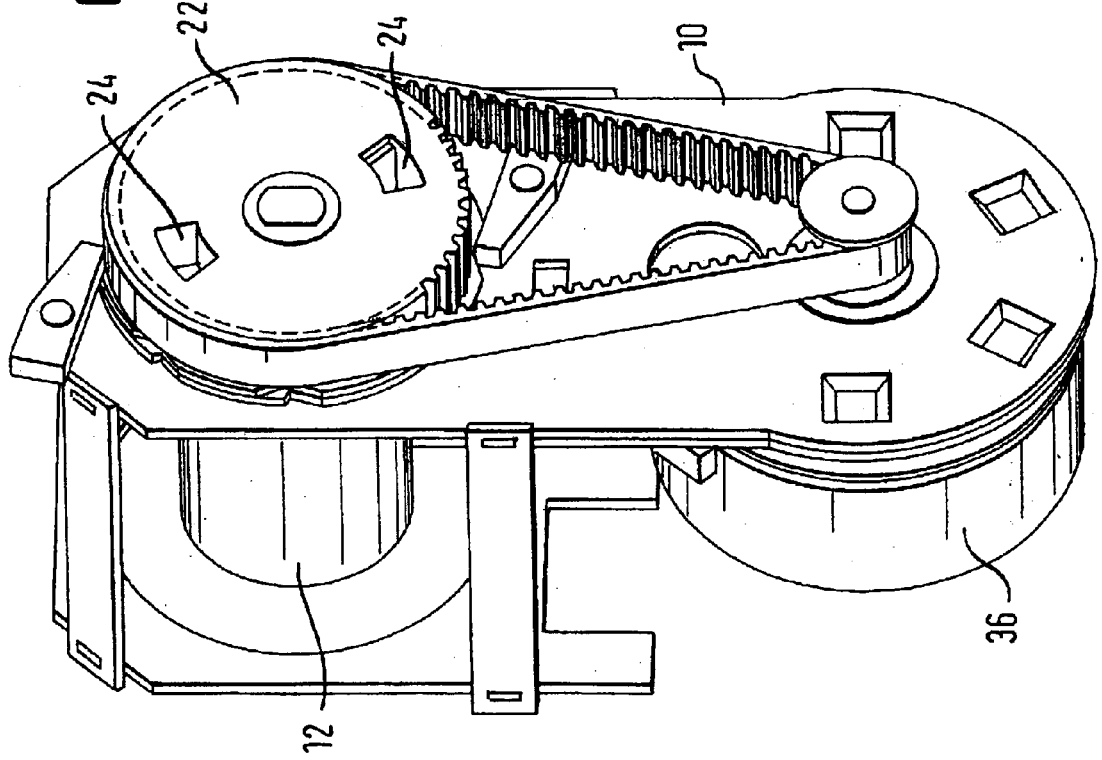
FIG. 2 shows in a perspective, diagrammatic view the belt retractor of FIG. 1, some components not being illustrated, for greater clarity.

In FIGS. 1 and 2 a belt retractor can be seen, which has a frame 10 and a belt spool 12 rotatably mounted in the frame. A vehicle safety belt can be received on the belt spool. Inside the belt spool 12, a torsion rod 14 is arranged, which at its left-hand end with respect to FIG. 1 is connected with the belt spool 12 for joint rotation therewith. At this end, a winding spring 16 is also connected, which biases the belt spool 12 in the belt band winding direction. A locking wheel 18 is connected for joint rotation with the right-hand end of the torsion rod 14 with respect to FIG. 1. The locking wheel 18 has a smooth outer peripheral surface which is interrupted at regular intervals by depressions 20. The depressions 20 have a side aligned in radial direction and also a side running obliquely from the deepest point of the depression to the outer peripheral surface, the radially aligned flank being that which with a rotation of the belt spool 12 and hence of the locking wheel 18 lags behind in the belt band unwinding direction. All the depressions 20 together form locking teeth on the locking wheel 18.

Figure 3:
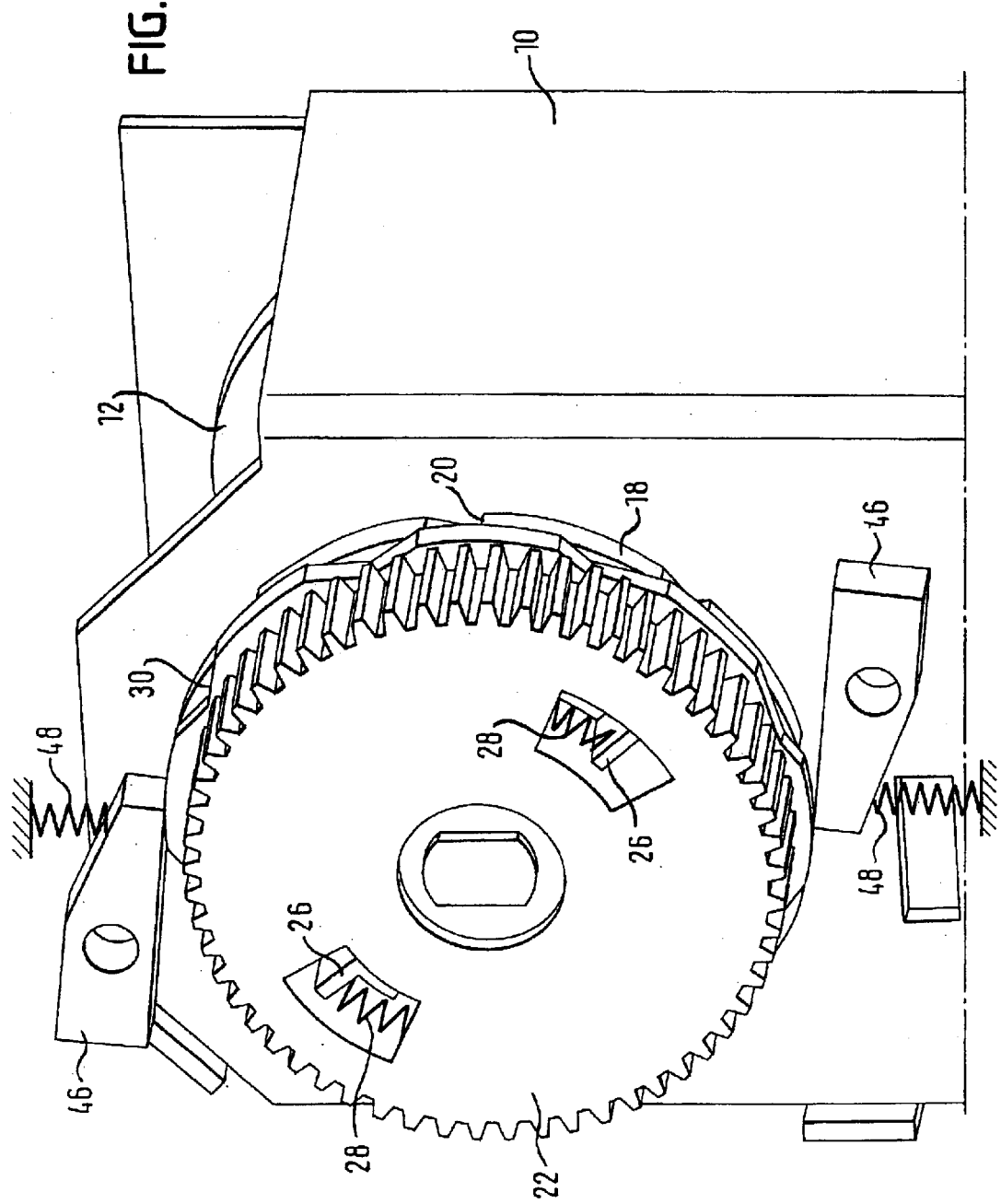
FIG. 3 shows in a perspective, enlarged view the locking mechanism of the belt retractor of FIG. 2 in the non-locked state.

Concentrically on the locking wheel 18, a drive wheel 22 is arranged which is provided with two recesses 24. In each recess 24 a tongue 26 engages, which is constructed on the locking wheel 18. Between each tongue 26 and a wall of the recess 24, a restoring spring 28 see FIG. 3 is arranged, which each act upon the drive wheel 22 relative to the locking wheel 18 into an initial position shown in FIG. 3. The drive wheel 22 is provided on its outer peripheral surface, in the same manner as the locking wheel 18, with several depressions which are given the reference number 30 here. In contrast to the depressions 20 of the locking wheel 18, the depressions 30 of the drive wheel 22 are constructed with two sides, arranged approximately symmetrically and running obliquely, so that control teeth are formed.

A drive motor 35 is coupled to the drive wheel 22 by a toothed belt 32 and a motor wheel 34. The drive motor is preferably a synchronous external rotor motor. The drive motor is controlled by a diagrammatically illustrated control unit 38, which receives signals from a diagrammatically illustrated vehicle acceleration sensor 40 and a diagrammatically illustrated belt spool sensor 44, the latter detecting the rotation of the belt spool.

On the frame 10 of the belt retractor, two locking catches 46 are arranged, which lie diametrically opposite each other with respect to the axis of rotation of the locking wheel 18 and of the drive wheel 22. The two locking catches 46 can be guided into the locking teeth of the locking wheel 18. For this purpose, they are each acted upon by a locking spring 48 indicated in FIG. 3 in the sense of an engagement into the locking teeth of the locking wheel 18.

With the aid of FIGS. 3 to 5, the mode of operation of the belt retractor is described below. The starting point here is a state of equilibrium, in which the belt band forces, the moment of rotation of the winding spring and the moment of rotation of the drive motor are in equilibrium, so that the belt spool does not rotate. As the winding spring 16 is dimensioned such that with a current-free drive motor 36 it can rotate the belt spool in the winding direction, it is necessary for this state of equilibrium that the drive motor 36 largely compensates for the moment of rotation of the winding spring. The drive motor therefore attempts to turn the drive wheel with respect to FIG. 3 in an anticlockwise direction. Only hereby is the drive wheel 22 situated relative to the locking wheel 18 in the initial position shown in FIG. 3, which is distinguished in that the depressions 20 of the locking wheel 18 are arranged staggered to the depressions 30 of the drive wheel 22. In other words, the depressions of one wheel are always in an angular section in which the other wheel has a smooth outer peripheral surface.

If, starting from the state of equilibrium of FIG. 3, belt band is to be withdrawn from the belt spool, i.e. the belt spool rotates anticlockwise with respect to FIG. 3, the drive motor supports this, in order to reduce the force which is felt on the belt band to a more comfortable level, which lies below the level which would be necessary to overcome the winding spring. On unwinding of the belt band, the drive wheel 22 remains in the initial position relative to the locking wheel 18, so that the locking catches 46 rest alternately on the outer surface of the drive wheel 22 and the outer surface of the locking wheel 18; in this way, they are prevented from engaging into the locking teeth of the locking wheel 18.

If by a sudden, intensive traction on the belt band the belt spool is now acted upon very quickly in the belt band unwinding direction, it "overtakes" the drive wheel, the restoring springs 28 being compressed. The depressions 20 of the locking wheel 18 then come to overlap the depressions 30 of the drive wheel 22 see FIG. 3, and the locking catches 46 can engage into the nearest depression 20 of the locking wheel 18; the belt spool is then locked. This state is shown in FIG. 4.

Figure 4:
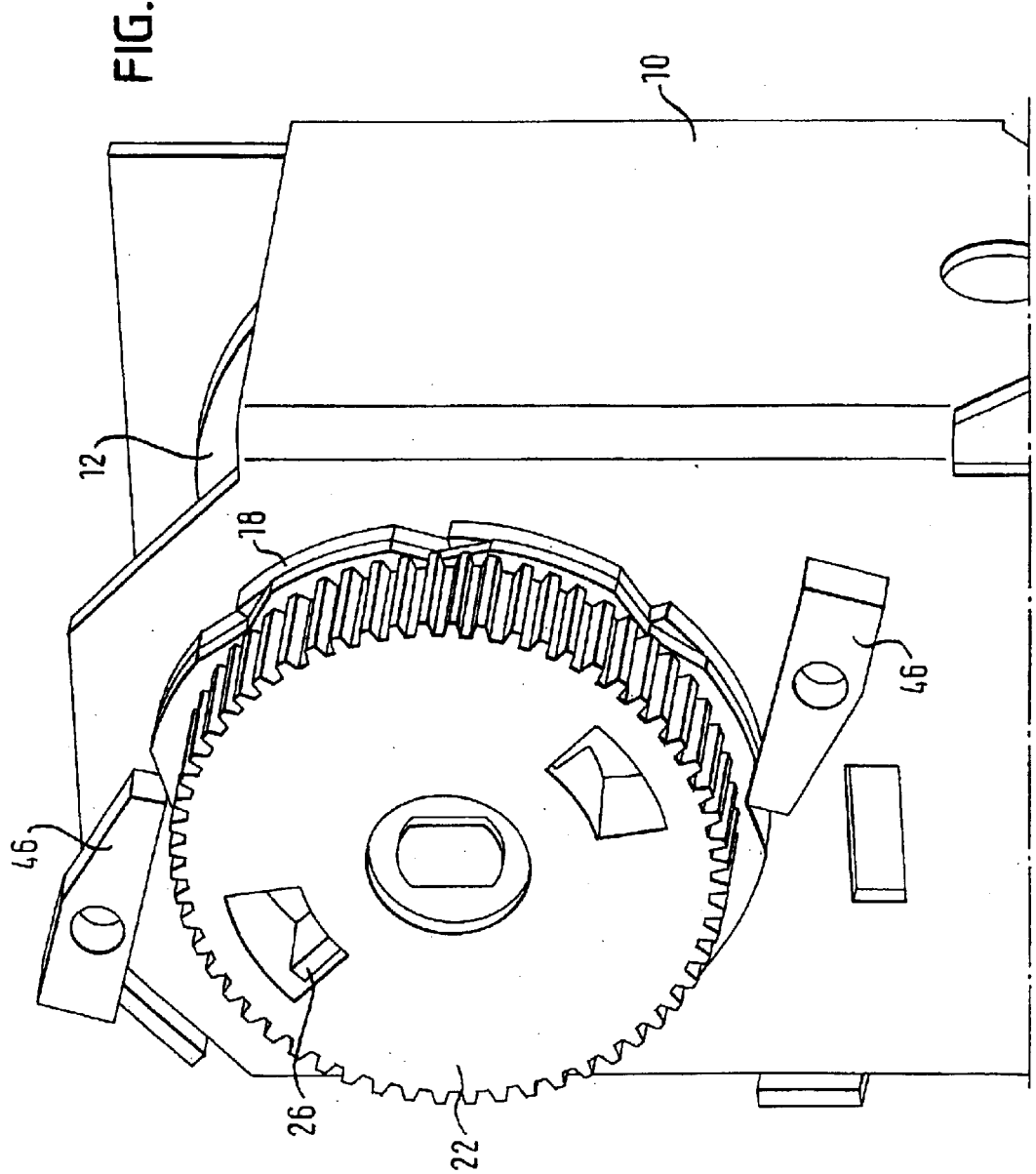
FIG. 4 shows the locking mechanism of FIG. 3 in the locked state.
Figure 5:
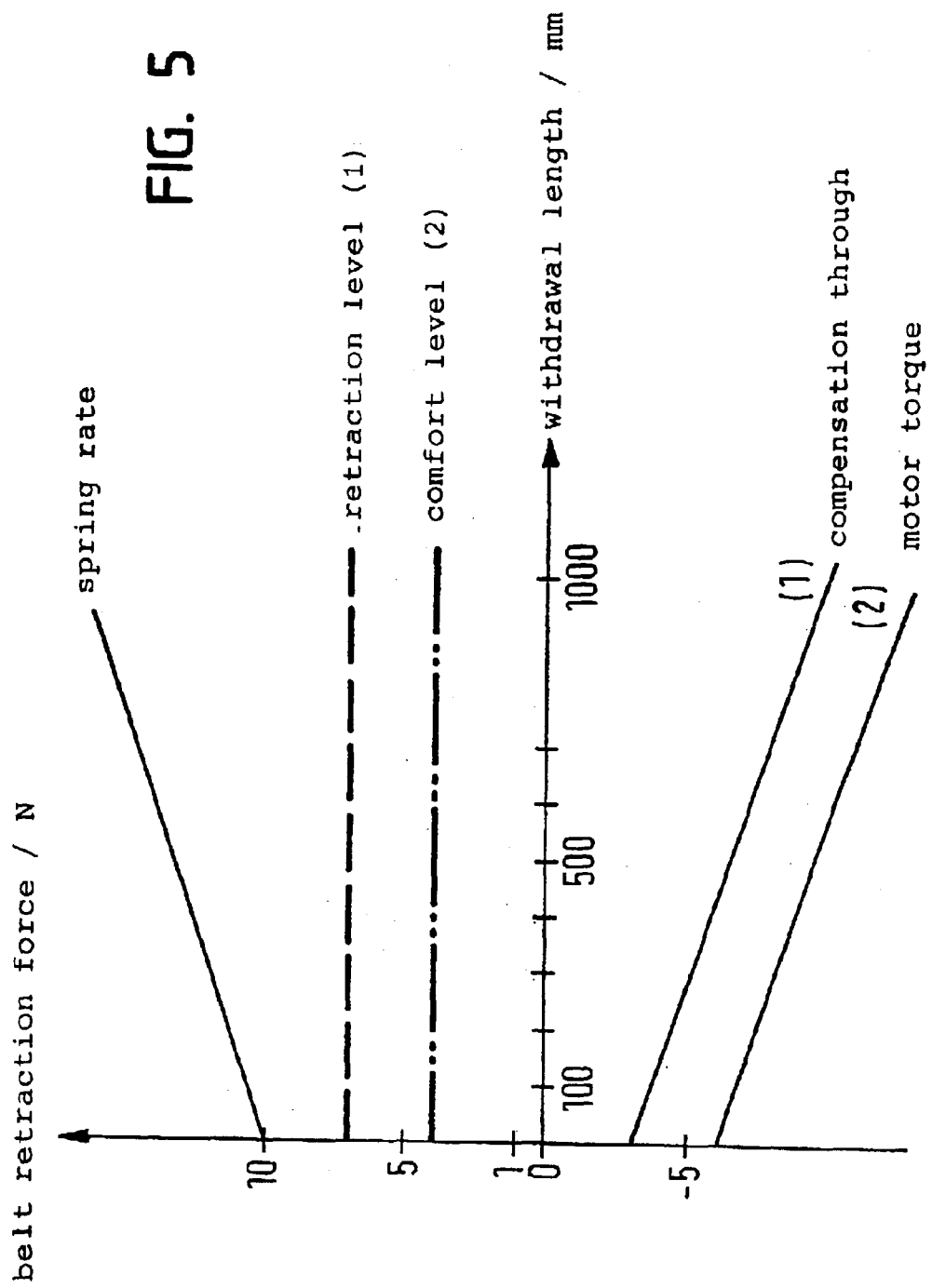
FIG. 5 shows a diagram of the curve of the belt band withdrawal force, the spring characteristic of the winding spring and also of the moment of rotation of the drive motor in various operating states.

If, starting from the locked state, the locking is to be released again, the drive motor is guided such that the drive wheel 22 is turned anticlockwise with respect to FIG. 4. In so doing, the corresponding sides of the depressions 30 of the drive wheel 22 ride up the tips of the locking catches 46 and press the latter radially outwards until they are guided out from the locking teeth of the locking wheel 18. Here, it is not necessary to turn the belt spool slightly in the belt band winding direction, because the sides of the locking teeth, against which the locking catches 46 lie, are aligned radially. The locking is terminated again as soon as the locking catches 46 lie on the smooth outer peripheral surface of the drive wheel 22 and have left the corresponding depression 20 of the locking wheel 18.

When the belt band is to be wound up on the belt spool, the holding torque of the drive motor 36 is reduced, so that the belt spool 12 turns in the belt band winding direction under the action of the winding spring 16.

When the belt band is to be wound up on the belt spool 12, it is merely necessary to reduce the holding torque of the drive motor 36, so that the now predominant force of the winding spring provides for the belt spool turning clockwise with respect to FIGS. 3 and 4.

If a defect occurs on the motor or on the motor control, and the motor does not provide any driving torque at all, the winding spring 16 ensures that the belt band is wound reliably on the belt spool 12. An emergency locking of the belt spool is also ensured. When belt band is withdrawn from the belt retractor, the drag moment of the drive motor 36 acts as resistance moment, plus an inertia-related torque, when the belt spool undergoes an acceleration of rotation. This resistance moment is sufficiently high in order to overcome the bias of the restoring springs 28, whereby the drive wheel 22 arrives into the locking position (shown in FIG. 4) relative to the locking wheel 18. Then the locking catches 46 will engage into the nearest depression 20 of the locking wheel 18 and lock the belt spool.

By means of the control unit 38, a plurality of comfort functions can be realized in the normal operation of the belt retractor. For example, it can be ensured that the belt band winding force on putting on the belt is lower than on taking it off, or also changes during the journey, depending of the manner of driving. In addition, it can be ensured that the belt band winding force does not change independently of the length of the belt band which is already wound.

Deviating from the embodiment which is shown, it is also possible to arrange the two locking catches so as to be not diametrically opposite each other, but rather to arrange them so as to be staggered with respect to the diametrical arrangement about an angle which corresponds to half the angle distance between two depressions. In this way, the rotation of the belt retractor required to reach the locked state can be reduced. It is basically also possible to use merely one single locking catch.

What is claimed is:

1. A belt retractor for a vehicle safety belt, said belt retractor comprising a frame, a belt spool which is rotatably arranged in said frame, a drive motor cooperating with a drive wheel which is coupled with said belt spool, a locking catch and locking teeth into which said locking catch is guided in order to lock said belt spool, the improvement wherein said drive wheel is rotatable relative to said belt spool to a limited extent and that said locking catch is controlled as a function of this relative rotation.

2. The belt retractor according to claim 1, wherein said locking teeth are constructed on a locking wheel which is securely connected with said belt spool, and wherein between said drive wheel and said locking wheel at least one restoring spring is provided, which biases said drive wheel relative to said locking wheel into an initial position.

3. The belt retractor according to claim 2, wherein said locking wheel is connected with said belt spool by a torsion rod.

4. The belt retractor according to claim 2, wherein said locking catch is acted upon by a locking spring permanently in the sense of an engagement into said locking teeth, wherein said drive wheel is provided with control teeth which are formed by depressions in an otherwise smooth outer peripheral surface of said drive wheel, and wherein said locking teeth and said control teeth are constructed such that in an initial position between said drive wheel and said locking wheel said outer peripheral surface of said drive wheel prevents said locking catch from being guided into said locking teeth.

5. The belt retractor according to claim 4, wherein said locking wheel has an outer peripheral surface which is smooth between said depressions forming said locking teeth, and wherein said locking catch rests against said smooth outer peripheral surface.

6. The belt retractor according to claim 1, wherein said locking catch is pivotally mounted on said frame.

7. The belt retractor according to claim 1, wherein a side of said locking teeth cooperating with said locking catch is not undercut.

8. The belt retractor according to claim 2, wherein said restoring spring, as a function of a drag moment of said drive motor when the latter is current-free, and of a rotational moment of inertia of said drive motor, is dimensioned such that a relative rotation between said drive wheel and said locking wheel only occurs when an angular acceleration of said belt spool in a belt band withdrawal direction exceeds a predetermined threshold value.

9. The belt retractor according to claim 2, wherein said restoring spring, as a function of a drag moment of said drive motor when the latter is current-free, is dimensioned such that a relative rotation between said drive wheel and said locking wheel occurs when said belt spool is turned in a belt band withdrawal direction.

10. The belt retractor according to claim 1, wherein a winding spring is provided, which acts upon said belt spool in a belt band winding direction with a torque which is greater than a drag moment of said drive motor when the latter is current-free.

11. The belt retractor according to claim 2, wherein an electronic control unit is provided, which controls said drive motor such that on withdrawal or winding up of said safety belt, a predetermined belt band force is always in effect.

12. The belt retractor according to claim 11, wherein said control unit receives a signal from a vehicle acceleration sensor and, on exceeding a predetermined vehicle acceleration, controls said drive motor such that said drive wheel is brought relative to said locking wheel into a locking position in which said locking catch engages into said locking teeth.

13. The belt retractor according to claim 11, wherein said control unit receives a signal from a belt spool sensor, proceeding from which an angular acceleration of said belt spool is determined, and wherein said control unit, on exceeding a predetermined angular acceleration of said belt spool, controls said drive motor such that said drive wheel is brought relative to said locking wheel into a locking position in which said locking catch engages into said locking teeth.

14. The belt retractor according to claim 13, wherein said belt spool sensor is a Hall sensor.

* * * * *